Patented Oct. 17, 1944

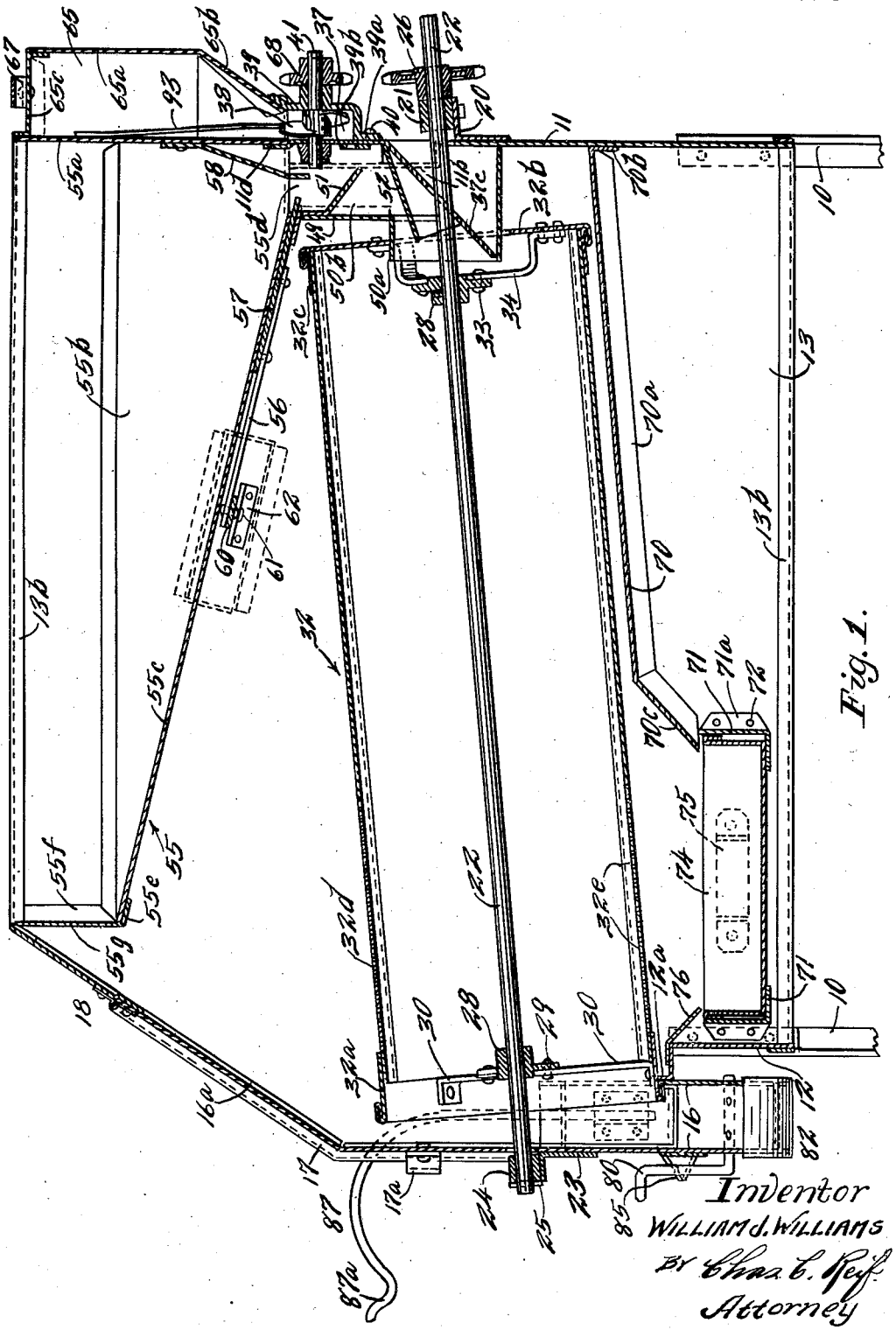

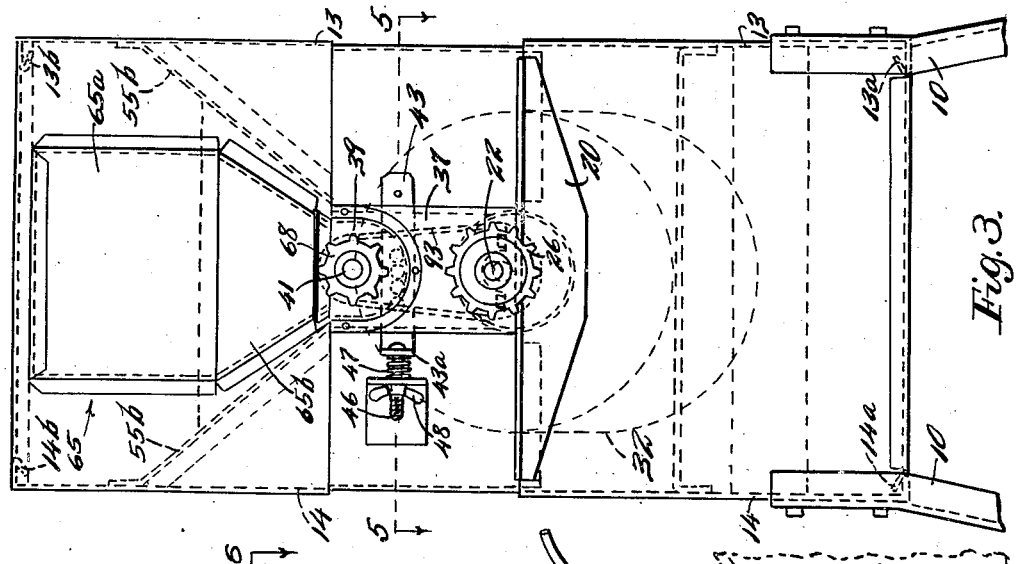
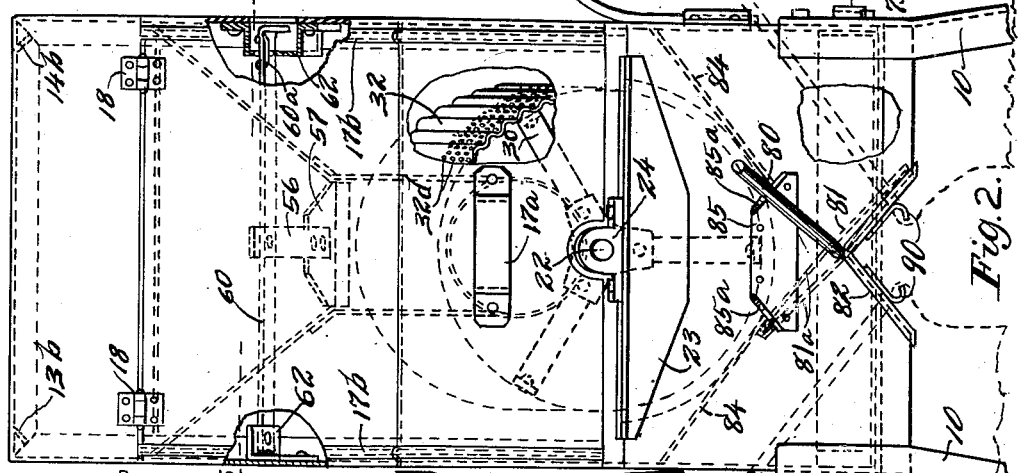
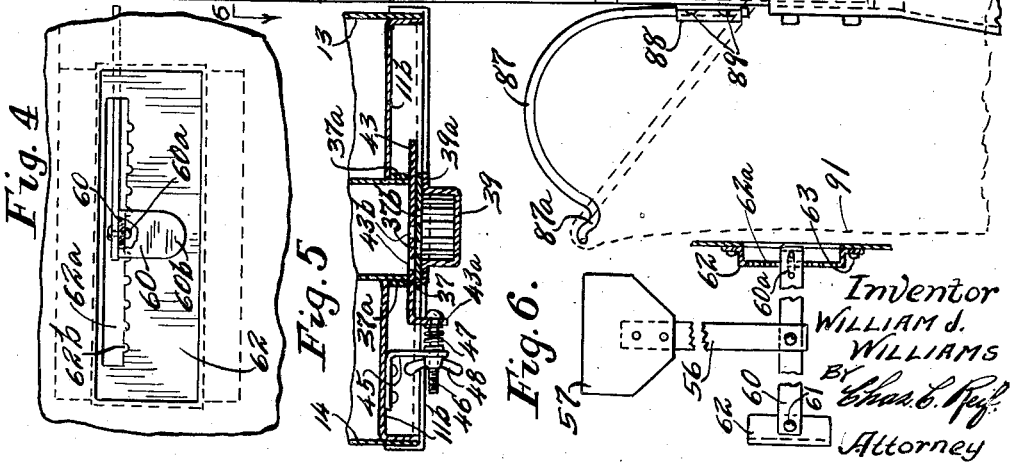

2,360,460

UNITED STATES PATENT OFFICE 2,360,460

GRAIN TREATING MACHINE

William J. Williams, Minneapolis, Minn., assignor to Pioneer Fanning Mill Company, Minneapolis, Minn., a corporation of Minnesota Application March 14, 1942, Serial No. 434,740

4 Claims. (Cl. 83—28)

This invention relates to a machine designed particularly for mixing grain with a powdered material. It is a more or less common practice to mix grain with various substances in powdered form such as copper carbonate, Ceresan a commercial product, and other substances, to combat smut and other diseases.

It is an object of this invention to provide a simple, compact and easily operated machine which will thoroughly mix the grain with the powdered material and will separate the grain from any surplus powdered material.

It is a further object of the invention to provide a simple and compact machine having a hopper for the grain leading to a feed passage, a hopper for the powdered material adjacent said feed passage and having one or more discharge openings together with means for positively feeding the powder through said discharge opening.

It is another object of the invention to provide such a device as set forth in the preceding paragraph together with simple and efficient means for regulating the amount of said powdered material fed to said passage.

It is still another object of the invention to provide a machine for thoroughly mixing grain and powdered material and separating the surplus powder from the grain comprising a novel and efficient form of container in which the grain and powder are mixed and subsequently separated, and the powder reclaimed.

These and other objects and advantages of the invention will be fully set forth in the following description made in connection with the accompanying drawings in which like reference characters refer to similar parts throughout the several views and in which—

Fig. 1 is a central longitudinal section through the machine;

Fig. 2 is a view in rear elevation, some parts being broken away and others shown in vertical section;

Fig. 3 is a view in front elevation of the machine;

Fig. 4 is a partial view in side elevation;

Fig. 5 is a horizontal section taken substantially on line 5—5 of Fig. 3 as indicated by the arrows; and Fig. 6 is a partial section taken on line 6—6 of Fig. 2 as indicated by the arrows.

Referring to the drawings a machine is shown comprising supporting legs 10. While these legs could be variously formed and of different number, in the embodiment of the invention illustrated, they are shown as made of angle bars and being four in number having their upper ends disposed at the corners of a rectangle. The upper portions of the legs are vertical and they diverge somewhat toward their ends as shown in Figs. 2 and 3. The angles of said legs are directed inwardly and a front plate 11 engages the inner sides of said angles at the front of the machine and extends vertically therefrom. A rear plate 12 engages the inner sides of said legs at the rear, the same extending vertically to substantially the top of said legs and then being bent to extend horizontally rearwardly for a short distance and then bent to extend vertically for a short distance. Side plates 13 and 14 are secured to the legs 10 and extend in vertical planes, the lower end of said plates being reversely bent as shown at 13a to form strengthening or reinforcing ribs. A trough-like portion comprising spaced plates 16 is carried by the upper end 12a of the plate 12 and extends across the rear of said machine. The rear plate 16 extends vertically for a considerable distance and has an upper portion 16a inclined forwardly and extending to the top of the machine. Said plate has an opening in said vertical and inclined portion and a door 17 extends over said opening, being carried by hinges 18, said door extending substantially the entire width of the machine. Door 17 is provided with parallel struck-up reinforcing ribs 17b adjacent its edges. A flanged bracket 20 is secured to front plate 11 just below an opening 11a in said plate, said bracket carrying a bearing 21 in which is journalled the upper end of a shaft 22. A flanged bracket 23 is secured to the outer side of rear plate 16, the same carrying a bearing 24 in which the lower or rear end of shaft 22 is journalled. A pin 25 extends through shaft 22 at the outer side of bearing 24 preventing forward movement of said shaft and a sprocket 26 is secured to shaft 22 at the outer side of bearing 21, the hub of said sprocket engaging bearing 21 and thus preventing rearward movement of shaft 22. Secured to shaft 22 are spaced spider hubs 28 having radially extending arms. Secured to the arms of rear members 28 by rivets 29 are radially extending bars 30 having their outer ends bent rearwardly at a right angle and secured to a cylindrical member 32a having its rear end folded into several thicknesses. Secured to the forward member 28 by rivets 33 are arms 34 extending radially and then forwardly, the same having their terminals bent to extend radially and being secured by rivets 35 to a substantially circular plate 32b having its outer portion folded and provided with a cylindrical flange 32c. A member 32d of general cylindrical shape extends between flange 32c and member 32a, being secured to the inner walls thereof in any suitable manner and held between plate 32 and the arms 30. Parts 32a and 32d comprise a mixing and sifting member 32. The wall of member 32d is provided with longitudinally extending projections and while these could be variously formed, said wall is shown of corrugated form as shown in Fig. 2 and said wall for the greater portion of its length at its upper portion is imperforate. The lower portion of said wall is provided with holes 32e so as to be perforate, or in the form of a sieve or screen. The front wall 11 is bent rearwardly for a short distance from a point substantially at the center of shaft 22 to some distance thereabove, thus forming offset or reentrant portions 11b as shown in Figs. 1 and 5. The outer sides of portions 11b extend at right angles thereto and are secured to side plates 13 and 14 as shown in Fig. 5. A plate 37 extends vertically in the plane of plate 11 covering the opening 11a and having inwardly extending flanges 37a. A member 39 has a flange 39a secured to the front of the upper portion of plate 37 by rivets 40, said member projecting outwardly from said plate and having a lower semi-cylindrical portion, the same having a chamber 39b therein. Said member has a projecting hub and a shaft 41 is journalled therein and also in a bearing 42 secured to the inner side of said plate portion 11. A short helical blade or conveyor 38 is secured to shaft 41 in chamber 39a. The plate 37 forms the inner side of chamber 39a and the same is provided with a plurality of transversely spaced holes or openings 37b. A plate 43 is disposed at and engages the inner side of said plate 37, the same passing through slots in the flanges 37a and having an outwardly turned end 43a. An angle bracket 45 is secured to one of the inwardly offset portions 11b and has an outwardly extending flange apertured to have pass therethrough a headed screw 46. Screw 46 at its headed portion is secured in flange 43a and bracket 45, and a compression coiled spring 47 surrounds screw 46 between bracket 45 and said end 43a, said spring thus acting to move plate 43 away from bracket 45. A wing nut 48 is threaded on screw 46 at the side of bracket 45 remote from flange 43a and engages said side of the bracket. It will be seen that by turning nut 48 plate 43 can be moved laterally. Plate 43 has therein a plurality of holes 43b adapted to move into and out of alignment with holes 37b. A member 50 having a cylindrical portion 50a extending through a central opening in plate 32b is provided and secured to plates 11 and 37 in any suitable manner, the same having a portion extending upwardly and forming a passage 50b. A plate 49 secured to plate 50 forms the rear or inner wall of passage 50b. A plate or chute 51 extends from plate 49 forwardly and downwardly and has its lower end spaced somewhat from plate 43 and disposed a short distance below the opening 43b. Another plate or chute 52 is provided extending inwardly and downwardly from plate 37, the same projecting within the cylindrical portion 50a of member 50. Plate 37 has a lower portion 37c extending downwardly and rearwardly to the bottom and inner edge of cylindrical portion 50a. Plate 53 is apertured for the passage of shaft 22, which shaft passes beneath plate 52. The upper edge of plate 37 is offset inwardly a short distance as shown at 11d and the front wall 55a of a grain hopper 55 overlaps plate 37, rests thereon and extends the full width of the machine, being formed at its upper portion by the side plates 13 and 14 which have their upper edges bent inwardly horizontally and then outwardly and downwardly diagonally as shown at 13b and 14b. Hopper 55 has downwardly converging side portions 55b having their upper edge portions extending along the inner sides of walls 13 and 14. These portions extend to a bottom member 55c which slopes downwardly and forwardly to the upper end of plate 51. Guide members 56 are disposed at the sides of bottom 55c and form a guideway for a reciprocating slide 57 adapted to move across a feed opening 55d at the forward lower end of hopper 55, said feed opening extending between the upper vertical portion of plate 51 and an inwardly and downwardly extending plate 58 secured to the front wall 55a. A plate 55g forms the rear side of hopper 55, the same having a lower flange 55e extending under a supporting bottom 55c and having flanges 55f secured to the side walls 13 and 14 respectively.

A lever 60 is provided, the same being pivoted about a pivot bolt or rivet 61 secured to an angle bracket 62 secured to the side wall 13, said lever extending across the machine beneath hopper bottom 55c and through a slot 62a in a bracket 62 having flanges secured by rivets 63 to the side wall 14. Side wall 14 is cut away adjacent bracket 62 and the bottom of slot 62a is provided with a plurality of notches 62b in which a rib 60a on the bottom of lever 60 is adapted to engage. The end of lever 60 is turned down to form a handle 60b which is accessible through the opening 14c in wall 14. It will be seen that by swinging lever 60 about its pivot 61 the slide 57 will be moved to different positions and will be held in a certain position by engagement of rib 60 in one of the notches 62a. A plate 65a is secured to the front of wall 55a and has a lower portion 65b inclining downwardly and inwardly and secured to the upper outwardly extending end of member 39. Said plate 65a forms a hopper 65 for the powdered material used and this hopper is provided with a removable top or lid 65c to which is secured a suitable handle 67. A sprocket wheel 68 is secured to the outer portion of shaft 41. A plate 70 has flanged portions 70a and 70b secured respectively to the walls 13, 14 and 11, said plate extending beneath container 32 for a considerable distance and having a downwardly inclined end portion 70c. Angle brackets 71 having vertical and horizontal flanges are secured to and extend between the walls 13 and 14, the same having end flanges 71a engaging said walls, the same being secured by rivets 72. The horizontal flanges of brackets 71 extend toward each other to form a support for a drawer 74 the sides of which are guided between the vertical flanges of brackets 71. The wall 14 is cut away at one side so that drawer 74 may be removed and said drawer is provided with a suitable handle 75. It will be noted that drawer 74 is disposed beneath the perforate portion of container 32. Plate 76 is secured to the top of plate 12 and extends downwardly in an inclined direction over one side of drawer 74. The flange 70c extends over the opposite side of drawer 74 so that any material dropping thereon will be directed into said drawer. A crank 80 is journalled in plates 16 and has secured to the portion between said plates a guide plate 81 formed by plates 81a disposed at either side of crank 80 and secured thereto. The handle portion of said crank 80 is disposed at the outer side of rear plates 16. Plates 16 are cut away at their central portions and a plate 82 of substantially right angular shape has flanges extending over said cut away portions, the apex of plate 82 being directed vertically and in vertical alignment with the center of crank 80. The space between plates 16 at the bottom thereof is open at each side of plate 82 and the plate 81 is adapted to substantially engage the sides of plate 82. Plates 84 extend from plates 13 and 14 downwardly in converging relation to a point below shaft 22 at the end of container 32. These plates extend downwardly to a position where they are engaged at the underside by plate 81 so that plate 81 forms a chute or guide guiding material downwardly between the plates 16. A bracket 85 is secured to the outer side of rear plate 16 and has its corners 85a bent outwardly substantially at right angles to form stops for crank 80. As shown in Fig. 2, when crank 80 engages one of the flanges 85a plate 81 is in position to guide the material discharging from container 30 to one or the other of the outlets between plates 16. A member 87 of arcuate form having a hook shaped end 87a is disposed at each side of the machine and swingingly mounted in brackets 88 secured to the outer sides of plates 13 and 14 by rivets 89. Hooks 90 are secured to the underside of plate 82. A bag 91 can have one edge hooked over one of the hooks 90 and its opposite edge hooked over the hook 87a with member 87 extending outwardly substantially at right angles to one of the side walls. The material discharged between plates 16 will thus pass into said bag. A chain 93 extends over sprockets 26 and 69. A resilient bar 93 is secured at its upper end to plate 55a and extends downwardly adjacent said member.

In operation the powdered material will be placed in hopper 65 and the grain to be treated will be placed in hopper 55. A bag 91 can be placed on the hooks 90 and 87a at the side through which the grain will be discharged. The slide or plate 43 will be adjusted by movement of nut 48 to bring the holes 11c and 43b into the desired alignment so that the desired amount of powdered material can pass therethrough. Slide 57 will be adjusted by means of lever 60 to give the desired size to the feed opening 55d. The shaft 22 will then be turned in any suitable manner as by placing a crank on the front end thereof and this shaft and container 42 will be rotated. When shaft 22 is rotated shaft 26 will be rotated and sprocket 68 will thus be rotated and rotate shaft 31 and member 38. The grain will pass through feed opening 55d into passage 50b and will be directed downwardly and forwardly by plate or chute 51 and will then be directed downwardly and rearwardly by plate 52 so as to pass through the end of member 50 and into container 32. The powdered material will drop into the chamber 39a forming the bottom of hopper 65 and will be agitated or stirred by member 38 and positively moved by said member to and through the holes 37b and 43b. Bar 93 will be moved by member 38 at each revolution of said member and will snap off the end of the helix to further agitate and keep the powdered material in a loose flowing condition. The powdered material will thus drop into the stream of grain as it passes over the end of plate 51. The mixture of grain and the powdered material will then pass as stated, from plate 52 into the end of container 32. The grain and powdered material will be tumbled about by the corrugations in the wall of container 32 and the separate grains will be effectively coated by said powdered material. The mixture of grain and powder passes downwardly in container 32 as the latter rotates and comes to the perforated lower portion of said container. Here the surplus powdered material which does not adhere to the grain will be sifted through the openings 32e and will drop into the drawer 74 from which it can be recovered. The grain which has been treated or coated with the powdered material passes on through the open lower end of container 32 and is discharged onto or between the plates 84 and falls onto plate 81 by which it is directed to one side or the other into the bag 91. When the bag is filled crank 80 can be swung over into engagement with the other stop flange 85a and plate 81 will be swung approximately 90 degrees and engage the other plate 84 and direct the grain through the other discharge opening. A bag will have previously been placed to receive the grain so that the operation can be made practically continuous. When not in use the members 87 can be swung to lie closely alongside of the plates 13 and 14.

From the above description it will be seen that I have provided a very simple, compact and efficient machine for treating the grain with the powdered material. It will be noted that all parts of the machine are kept substantially within or close to the side plates so that the machine can be easily packed in a container having parallel side walls. This structure also results in no objectionable projecting parts. The door 17 can be lifted by means of handle 17a when desired to give access to the parts within the walls 13 and 14. The plate 43 can be easily and quickly adjusted to give the desired feed to the powdered material so that the proper amount is delivered to appropriately treat or coat the grain. The machine can thus be quickly and easily adjusted to feed the proper proportions of grain and powdered material. The operation of the machine is quite rapid. The grain is quickly treated and coated as desired and the surplus powder easily reclaimed. The machine has been amply demonstrated in actual practice, found to be very successful and efficient and is being commercially made.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A machine for mixing grain with a powdered material having in combination, a downwardly inclined rotatable mixing and sifting container of general cylindrical form, a grain hopper above said container having a feed opening adjacent the upper end of said container, a passage leading downwardly from said feed opening to the upper end of said container, a hopper for powder having a chamber at its bottom at one side of said feed passage and having a plurality of discharge openings, a plate slidable along the side of said chamber having a plurality of holes therethrough adapted to be brought into or out of alignment with said first mentioned holes, means for moving said plate and holding it in different positions, the passage through said holes communicating with said first mentioned passage, a rotatable means in said chamber for positively feeding powder through said holes and means for rotating said container.

2. A machine for mixing grain with a powdered material having in combination, a rotatable mixing and sifting means, a passage through which grain is discharged into said means, a hopper for powder having a downwardly inclined wall and a chamber below said wall at one side of said passage, a plurality of holes leading from said chamber to said passage, a plate slidable along the wall of said chamber and having a plurality of holes therethrough adapted to be moved into or out of alignment with said first mentioned holes, a fixed bracket, a threaded rod secured to said plate and passing through said bracket, a compression coiled spring between said bracket and plate tending to move the same in one direction and means on said threaded member engaging said bracket and adapted to be rotated for moving and permitting movement of said plate to different positions.

3. The structure set forth in claim 2 and rotatable helical means from said chamber for positively feeding powder through said holes.

4. A machine for mixing grain with a powdered material having in combination, a downwardly inclined rotatable container of general cylindrical form, a hopper for grain disposed above said container having a feed opening at its lower and forward end, a passage leading downwardly from said feed opening, a hopper for powdered material having a discharge opening at one side of said passage and below said feed opening for discharging said powdered material into said passage, a chute below said feed opening extending from the side of said passage opposite said discharge opening downwardly toward the opposite side of said passage and terminating adjacent said discharge opening, a second chute leading from the side of said passage at which said discharge opening is located and below said discharge opening, downwardly toward said container to discharge through the upper end thereof, means for feeding said powdered material through said discharge opening and means for rotating said container whereby said powdered material is fed to said grain as it passes through said passage and is directed toward said discharge opening and said grain and powdered material are thoroughly mixed in said container, the surplus powder passing through the perforate wall of said container and said grain being discharged through said open lower end.

WILLIAM J. WILLIAMS.